United States Patent [19]
Coomansingh

[11] Patent Number: 6,159,017
[45] Date of Patent: Dec. 12, 2000

[54] DOLL WITH PREPROGRAMED AUDITORY INTERNAL ORGANS

[76] Inventor: Belden J. L. Coomansingh, 2724 N. Hill Ter., Cleburne, Tex. 76031

[21] Appl. No.: 09/453,616

[22] Filed: Dec. 3, 1999

[51] Int. Cl.[7] .............................. G09B 23/28; A63H 3/28
[52] U.S. Cl. ...................... 434/267; 434/266; 434/272; 446/295; 446/296; 446/297
[58] Field of Search ................................ 434/272, 266, 434/267; 446/297, 295, 296

[56] References Cited

U.S. PATENT DOCUMENTS

| | | | |
|---|---|---|---|
| 2,288,296 | 6/1942 | Munro | 434/272 |
| 2,678,505 | 5/1954 | Munson | 434/272 |
| 3,154,881 | 11/1964 | Elwell | 434/266 |
| 3,999,309 | 12/1976 | Gonzalez | 434/272 |
| 4,710,145 | 12/1987 | Hall Vandis | 446/100 |
| 4,822,285 | 4/1989 | Summerville | 434/272 |
| 4,938,696 | 7/1990 | Foster | 434/267 |
| 5,295,694 | 3/1994 | Levin | 273/447 |

*Primary Examiner*—Jacob K. Ackun
*Assistant Examiner*—K. Fernstrom

[57] ABSTRACT

A doll with preprogramed auditory internal organs for a useful tool of teaching children about the human body. The doll with preprogramed auditory internal organs includes a body member made of pliable plastic and including a head region having an internal cavity and a detachable forehead cover, and further including a torso region connected to the head region and having an internal cavity and a detachable front torso cover, and further includes multiple human organ-like members disposed inside the respective cavities of the body member, and also includes a microprocessor unit disposed inside the human organ-like members, circuit boards having integrated chips with pre-programed messages, speakers, contact switches for energizing the microprocessor unit, power source to energize the microprocessor.

17 Claims, 4 Drawing Sheets

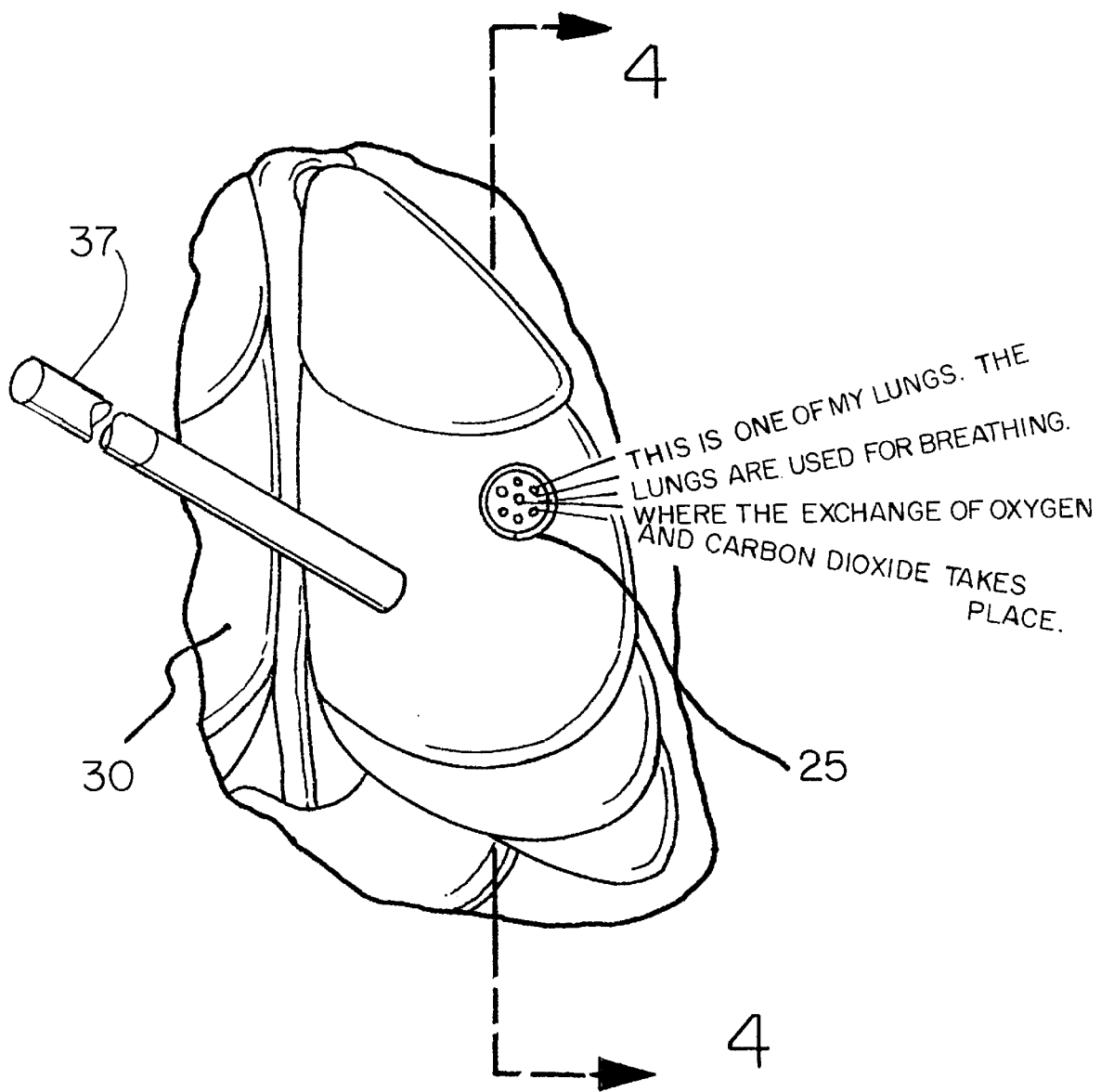

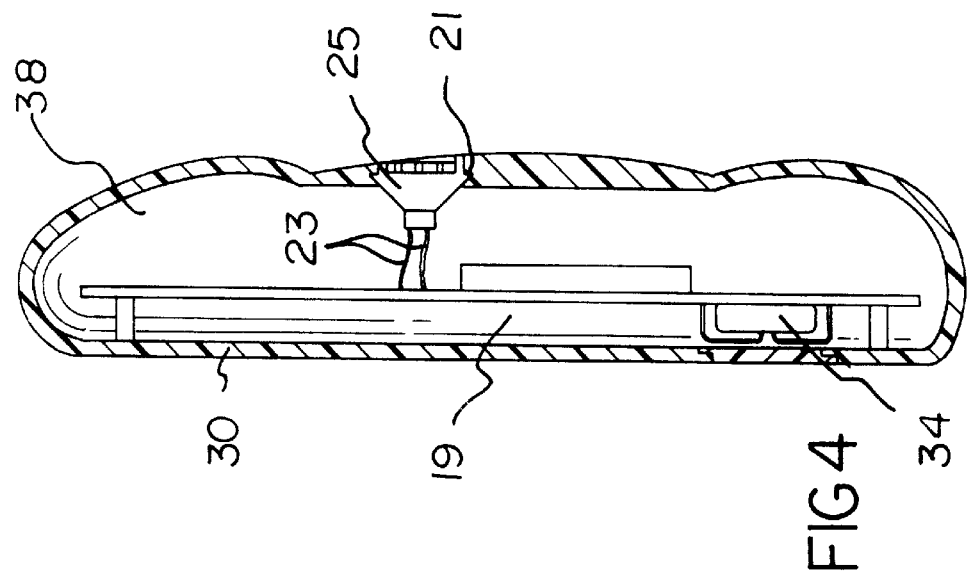
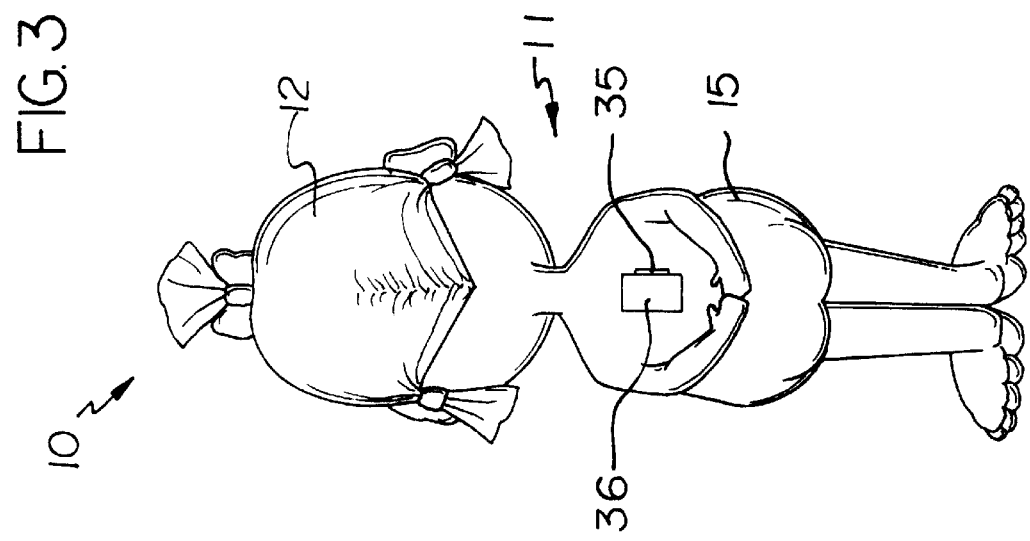

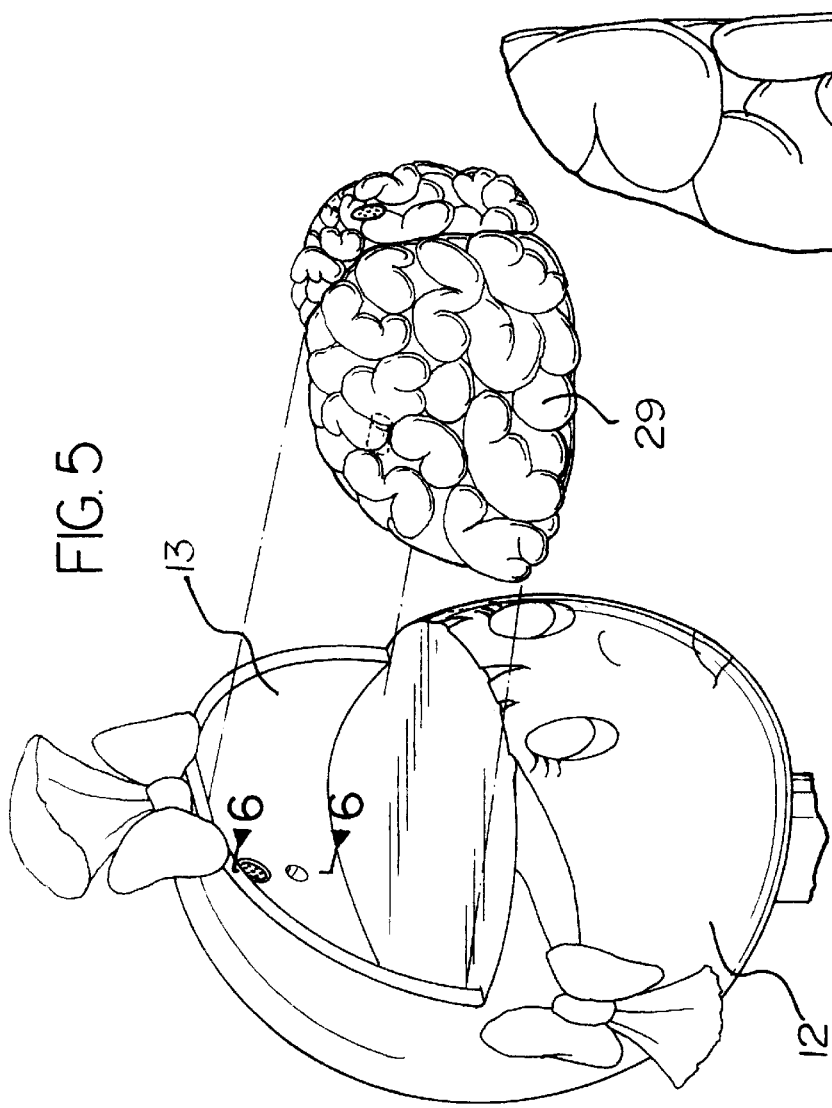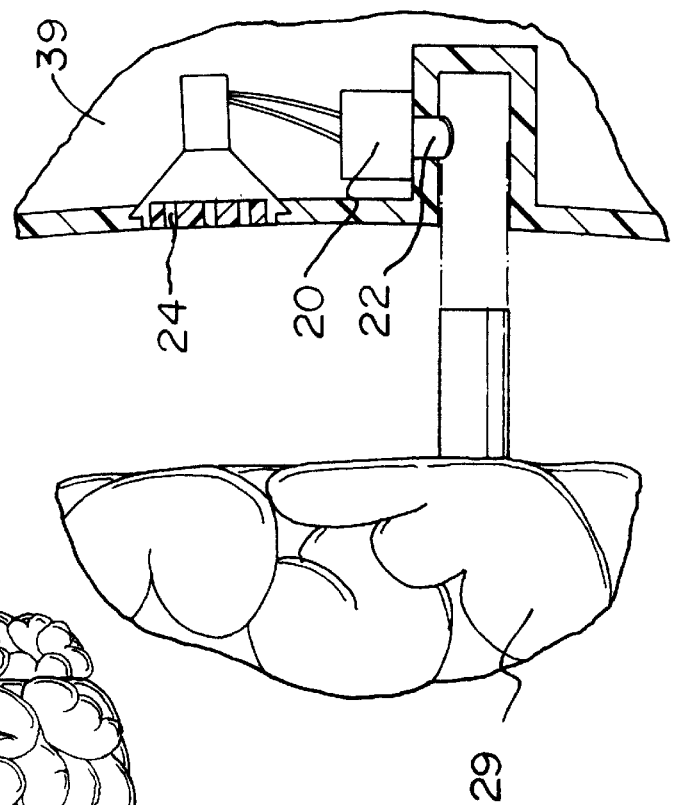

DOLL WITH PREPROGRAMED AUDITORY INTERNAL ORGANS

BACKGROUND OF THE INVENTION

1. Field of the Invention

The present invention relates to an anatomical, auditory doll and more particularly pertains to a new doll with preprogramed auditory internal organs for a useful tool of teaching children about the human body.

2. Description of the Prior Art

The use of an anatomical, auditory doll is known in the prior art. More specifically, an anatomical, auditory doll heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,451,178; U.S. Pat. No. 5,518,407; U.S. Pat. No. 5,376,038 U.S. Pat. No. 5,356,295; U.S. Pat. No. 4,938,696; and U.S. Pat. No. 4,451,911.

While these devices fulfill their respective, particular objectives and requirements, the aforementioned patents do not disclose a new doll with preprogramed auditory internal organs. The inventive device includes a body member made of pliable plastic and including a head region having an internal cavity and a detachable forehead cover, and further including a torso region connected to the head region and having an internal cavity and a detachable front torso cover, and further includes multiple human-like organ members disposed inside the respective cavities of the body member, and also includes speech chip/microprocessors disposed inside the human organ-like members, speakers, contact switches for energizing the speech chip/microprocessors, power source to energize the speech chip/microprocessors, and a switch-activating member.

In these respects, the doll with preprogramed auditory internal organs according to the present invention substantially departs from the conventional concepts and designs of the prior art, and in so doing provides an apparatus primarily developed for the purpose of a useful tool of teaching children about the human body.

SUMMARY OF THE INVENTION

In view of the foregoing disadvantages inherent in the known types of an anatomical, auditory doll now present in the prior art, the present invention provides a new doll with preprogramed auditory internal organs construction wherein the same can be utilized for a useful tool of teaching children about the human body.

The general purpose of the present invention, which will be described subsequently in greater detail, is to provide a new doll with preprogramed auditory internal organs apparatus and method which has many of the advantages of the an anatomical, auditory doll mentioned heretofore and many novel features that result in a new doll with preprogramed auditory internal organs which is not anticipated, rendered obvious, suggested, or even implied by any of the prior art an anatomical, auditory doll, either alone or in any combination thereof.

To attain this, the present invention generally comprises a body member made of pliable plastic and including a head region having an internal cavity and a detachable forehead cover, and further including a torso region connected to the head region and having an internal cavity and a detachable front torso cover, and further includes multiple human-like organ members disposed inside the respective cavities of the body member, and also includes speech chip/microprocessors disposed inside the human organ-like members, speakers, contact switches for energizing the speech chip/microprocessors, power source to energize the speech chip/microprocessors, and a switch-activating member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new doll with preprogramed auditory internal organs apparatus and method which has many of the advantages of the an anatomical, auditory doll mentioned heretofore and many novel features that result in a new doll with preprogramed auditory internal organs which is not anticipated, rendered obvious, suggested, or even implied by any of the prior art an anatomical, auditory doll, either alone or in any combination thereof.

It is another object of the present invention to provide a new doll with preprogramed auditory internal organs which may be easily and efficiently manufactured and marketed.

It is a further object of the present invention to provide a new doll with preprogramed auditory internal organs which is of a durable and reliable construction.

An even further object of the present invention is to provide a new doll with preprogramed auditory internal organs which is susceptible of a low cost of manufacture with regard to both materials and labor, and which accordingly is then susceptible of low prices of sale to the consuming public, thereby making such doll with preprogramed auditory internal organs economically available to the buying public.

Still yet another object of the present invention is to provide a new doll with preprogramed auditory internal organs which provides in the apparatuses and methods of the prior art some of the advantages thereof, while simultaneously overcoming some of the disadvantages normally associated therewith.

Still another object of the present invention is to provide a new doll with preprogramed auditory internal organs for a useful tool of teaching children about the human body.

Yet another object of the present invention is to provide a new doll with preprogramed auditory internal organs which includes a body member made of pliable plastic and including a head region having an internal cavity and a detachable forehead cover, and further including a torso region connected to the head region and having an internal cavity and a detachable front torso cover, and further includes multiple human-like organ members disposed inside the respective cavities of the body member, and also includes speech chip/microprocessors disposed inside the human organ-like members, speakers, contact switches for energizing the speech chip/microprocessors, power source to energize the speech chip/microprocessors, and a switch-activating member.

Still yet another object of the present invention is to provide a new doll with preprogramed auditory internal organs that would provide hours of fun and would be appealing to children.

Even still another object of the present invention is to provide a new doll with preprogramed auditory internal organs that would allow children to learn while playing with the doll.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a detailed elevational view of one of the human organ-like members of the present invention.

FIG. 3 is a rear elevational view of the present invention.

FIG. 4 is a detailed cross-sectional view of a means for emitting an audible message for the present invention.

FIG. 5 is an exploded detailed view of the head region of the present invention.

FIG. 6 is an exploded cross-sectional view of the brain-like member of the present invention.

DESCRIPTION OF THE PREFERRED EMBODIMENT

Figure 1:
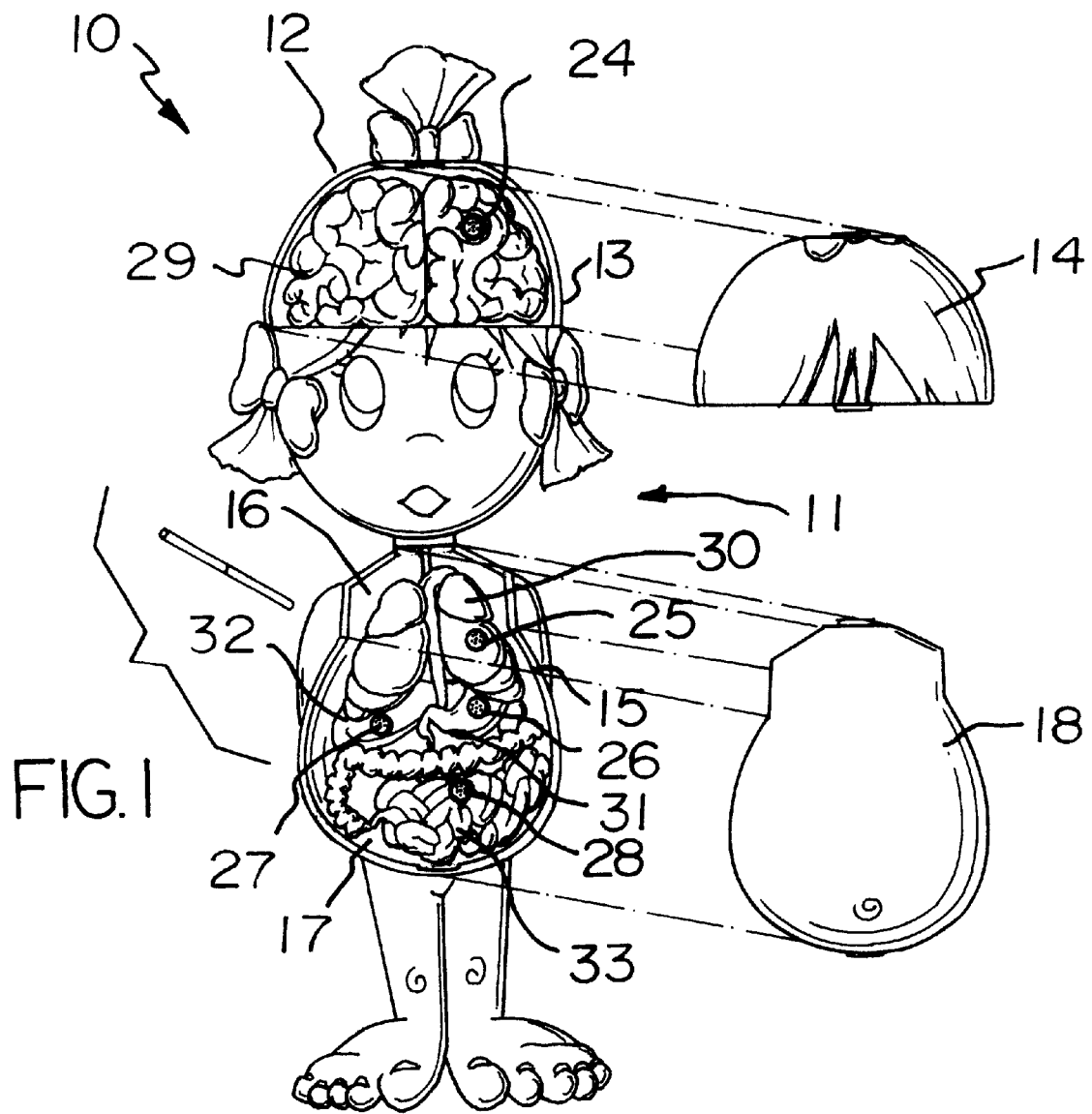
FIG. 1 is a frontal elevational view of a new doll with preprogramed auditory internal organs according to the present invention.

With reference now to the drawings, and in particular to FIGS. 1 through 6 thereof, a new doll with preprogramed auditory internal organs embodying the principles and concepts of the present invention and generally designated by the reference numeral 10 will be described.

As best illustrated in FIGS. 1 through 6, the doll with preprogramed auditory internal organs 10 generally comprises a body member 11 having a head region 12 and a torso region 15 connected to the head region 12. The head region 12 has a head cavity 13 inside thereof and a detachable forehead cover 14 for accessing the head cavity 13. The torso region 15 has a chest cavity 16 and an abdominal cavity 17 inside thereof and a detachable front torso cover 18 for accessing the chest cavity 16 and the abdominal cavity 17. The torso member 15 has an opening 35 in a backside thereof, and has a detachable cover 36 over the opening 35.

A plurality of human-like organ members 29–33 are disposed in their respective head, chest and abdominal cavities. The human-like organ members 29–33 include a brain-shaped member 29 disposed in the head cavity 12, a lung-shaped member 30 disposed in the chest cavity 16, a liver-shaped member 32 disposed in the abdominal cavity 17, a stomach-shaped member 31 disposed in the abdominal cavity 17, and intestinal-shaped member 33 disposed in the abdominal cavity 17. Each of the human-like organ members 29–33 has a cavity 38,39 inside thereof.

A means for activating and playing pre-programmed audible messages for each of the human-like organ members 29–33 includes a plurality of integrated speech chip/microprocessors 19,20, a plurality of speech-activating switches 21,22 each of which is connected with wires 23 to and for energizing a respective one of the integrated speech chip/microprocessors 19,20. A power source 34 is connected with wires to the speech-activating switches 21,22. A plurality of speakers 24–28 are connected with wires to respective integrated speech chip/microprocessors 19,20. An external switch-activating member 37 is used to activate the switches 21,22. Each of the integrated speech chip/microprocessors 19,20 is disposed in the cavity 38,39 of a respective one of the human-like organ members 29–33. Each of the speech-activating switches 21,22 is securely and conventionally disposed in the cavity 38,39 of a respective one of the human-like organ members 29–33. Also, each of the speech-activating switches 21,22 is securely disposed near an outer wall of a respective one of the human-like organ members 29–33 so that the speech-activating switches 21,22 can be activated by external contact with the switch-activating member 37. Each of the speakers 24,28 is securely disposed in an outer wall of a respective one of the human-like organ members 29–33 so that a pre-programmed message can be heard by a user with the switch-activating member 37 being essentially an elongate pointer. Each of the integrated speech chip/microprocessors 19,20 is programmed with a message relating specifically to a respective one of the human-like organ members 29–33 so that a user can learn about that particular human-like organ member. The speech-activating switches 21,22 are essentially contact switches.

In use, the user can play with the doll like any other doll and can remove the particular forehead cover 14 and the torso cover 18 thus exposing the internal human-like organ members 29–33. Depending upon which human-like organ member the user would like to learn about, the user would use the switch-activating member 37 and touch the spot where the particular speech-activating switch 21,22 is located. A pre-programmed message will be delivered through the particular speaker. The user can learn about each of the human-like organ members 29–33 by touching the respective speech-activating switches 21,22 as desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A doll with pre-programmed auditory internal organs comprising:
    a body member having a head region and a torso region connected to said head region, said head region having a head cavity inside thereof and a detachable forehead cover for accessing said head cavity, said torso region having a chest cavity and an abdominal cavity inside thereof and a detachable front torso cover for accessing said chest cavity and said abdominal cavity;
    a plurality of human-like organ members disposed in their respective said head, chest and abdominal cavities, said human-like organ members including a brain-shaped member disposed in said head cavity, a lung-shaped member disposed in said chest cavity, a liver-shaped member disposed in said abdominal cavity, a stomach-shaped member disposed in said abdominal cavity, and intestine-shaped member disposed in said abdominal cavity;
    a means for activating and playing pre-programmed audible messages for each of said human-like organ members;
    wherein said torso member has an opening in a backside thereof, and has a detachable cover over said opening;
    wherein each of said human-like organ members has a cavity inside thereof; and
    wherein said means for activating and playing pre-programmed audible messages includes a plurality of integrated speech chip/microprocessors, a plurality of speech-activating switches each of which is connected to and for energizing a respective one of said integrated speech chip/microprocessors, a power source connected to said speech-activating switches and removably disposed through said opening in said torso member, a plurality of speakers each of which is connected to a respective one of said integrated speech chip/microprocessors, and a switch-activating member.

2. A doll with pre-programmed auditory internal human-like organ members as described in claim 1, wherein each of said integrated speech chip/microprocessors is disposed in said cavity of a respective one of said human-like organ members.

3. A doll with pre-programmed auditory internal human-like organ members as described in claim 2, wherein each of said speech-activating switches is securely disposed in said cavity of a respective one of said human-like organ members.

4. A doll with pre-programmed auditory internal human-like organ members as described in claim 3, wherein each of said speech-activating switches is disposed near an outer wall of a respective one of said human-like organ members so that said speech-activating switches can be activated by external contact with said switch-activating member.

5. A doll with pre-programmed auditory internal human-like organ members as described in claim 4, wherein each of said speakers is securely disposed in an outer wall of a respective one of said human-like organ members so that a pre-programmed message can be heard by a user.

6. A doll with pre-programmed auditory internal human-like organ members as described in claim 1, wherein said switch-activating member comprises an elongate pointer.

7. A doll with pre-programmed auditory internal human-like organ members as described in claim 1, wherein each of said integrated speech chip/microprocessors is programmed with a message relating specifically to a respective one of said human-like organ members so that a user can learn about that particular said human-like organ member.

8. A doll with pre-programmed auditory internal human-like organ members as described in claim 1, wherein said speech-activating switches comprise contact switches.

9. A doll with pre-programmed auditory internal organs comprising:
    a body member having a head region and a torso region connected to said head region, said head region having a head cavity inside thereof and a detachable forehead cover for accessing said head cavity, said torso region having a chest cavity and a abdominal cavity inside thereof and a detachable front torso cover for accessing said chest cavity and said abdominal cavity, said torso member having an opening in a backside thereof, and having a detachable cover over said opening;
    a plurality of human-like organ members disposed in their respective said head, chest and abdominal cavities, said human-like organ members including a brain-shaped member disposed in said head cavity, a lung-shaped member disposed in said chest cavity, a liver-shaped member disposed in said abdominal cavity, a stomach-shaped member disposed in said abdominal cavity, and intestinal-shaped member disposed in said abdominal cavity, each of said human-like organ members having a cavity inside thereof; and a means for activating and playing pre-programmed audible messages for each of said human-like organ members including a plurality of integrated speech chip/microprocessors, a plurality of speech-activating switches each of which is connected to and for energizing a respective one of said integrated speech chip/microprocessors, a power source connected to said speech-activating switches, a plurality of speakers each of which is connected to a respective one of said integrated speech chip/microprocessors, and a switch-activating member, each of said integrated speech chip/microprocessors being disposed in said cavity of a respective one of said human-like organ members, each of said speech-activating switches being securely disposed in said cavity of a respective one of said human-like organ members, each of said speech-activating switches being securely disposed near an outer wall of a respective one of said human-like organ members so that said speech-activating switches can be activated by external contact with said switch-activating member, each of said speakers being securely disposed in an outer wall of a respective one of said human-like organ members so that a pre-programmed message can be heard by a user, said switch-activating member being essentially an elongate pointer, each of said integrated speech chip/microprocessors being programmed with a message relating specifically to a respective one of said human-like organ members so that a user can learn about that particular said human-like organ member, said speech-activating switches being essentially contact switches.

10. A doll comprising:

a body member having a head region and a torso region connected to said head region, said head region having a head cavity inside thereof and a detachable forehead cover for accessing said head cavity, said torso region having a chest cavity and an abdominal cavity inside thereof and a detachable front torso cover for accessing said chest cavity and said abdominal cavity;

a plurality of human-like organ members, said human-like organ members including a brain-shaped member disposed in said head cavity, a lung-shaped member disposed in said chest cavity, a liver-shaped member disposed in said abdominal cavity, a stomach-shaped member disposed in said abdominal cavity, and intestine-shaped member disposed in said abdominal cavity;

a means for activating and playing pre-programmed audible messages for each of said human-like organ members;

wherein said torso member has an opening therein; and wherein said means for activating and playing pre-programmed audible messages includes a plurality of integrated speech chip/microprocessors, a plurality of speech-activating switches each of which is connected to and for energizing a respective one of said integrated speech chip/microprocessors, a power source connected to said speech-activating switches and removably disposed through said opening in said torso member, a plurality of speakers each of which is connected to a respective one of said integrated speech chip/microprocessors, and a switch-activating member.

11. A doll as described in claim 10, wherein each of said human-like organ members has a cavity inside thereof, wherein each of said integrated speech chip/microprocessors is disposed in said cavity of a respective one of said human-like organ members.

12. A doll with pre-programmed auditory internal human-like organ members as described in claim 11, wherein each of said speech-activating switches is securely disposed in said cavity of a respective one of said human-like organ members.

13. A doll with pre-programmed auditory internal human-like organ members as described in claim 12, wherein each of said speech-activating switches is disposed near an outer wall of a respective one of said human-like organ members so that said speech-activating switches can be activated by external contact with said switch-activating member.

14. A doll with pre-programmed auditory internal human-like organ members as described in claim 10, wherein each of said speakers is securely disposed in an outer wall of a respective one of said human-like organ members so that a pre-programmed message can be heard by a user.

15. A doll with pre-programmed auditory internal human-like organ members as described in claim 10, wherein said switch-activating member comprises an elongate pointer.

16. A doll with pre-programmed auditory internal human-like organ members as described in claim 10, wherein each of said integrated speech chip/microprocessors is programmed with a message relating specifically to a respective one of said human-like organ members so that a user can learn about that particular said human-like organ member.

17. A doll with pre-programmed auditory internal human-like organ members as described in claim 10, wherein said speech-activating switches comprise contact switches.

* * * * *